(12) United States Patent
Polegato Moretti

(10) Patent No.: US 7,546,697 B2
(45) Date of Patent: Jun. 16, 2009

(54) METHOD FOR MANUFACTURING BREATHABLE SHOE

(75) Inventor: Mario Polegato Moretti, Crocetta Del Montello (IT)

(73) Assignee: GEOX S.p.A., Montebelluna (IT)

( * ) Notice: Subject to any disclaimer, the term of this patent is extended or adjusted under 35 U.S.C. 154(b) by 38 days.

(21) Appl. No.: 11/932,859

(22) Filed: Oct. 31, 2007

(65) Prior Publication Data

US 2008/0052956 A1 Mar. 6, 2008

Related U.S. Application Data

(60) Continuation of application No. 11/625,468, filed on Jan. 22, 2007, now Pat. No. 7,370,382, which is a continuation of application No. 11/177,668, filed on Jul. 11, 2005, now abandoned, which is a division of application No. 10/902,783, filed on Aug. 2, 2004, now abandoned, which is a continuation of application No. 10/009,482, filed as application No. PCT/EP01/04050 on Apr. 9, 2001, now Pat. No. 6,823,609.

(30) Foreign Application Priority Data

Apr. 13, 2000 (IT) .......................... PD2000A0091

(51) Int. Cl.
*A43B 7/06* (2006.01)
*A43B 23/07* (2006.01)

(52) U.S. Cl. ................ 36/30 R; 36/3 B; 36/55

(58) Field of Classification Search ............. 36/30 R, 36/3 B, 55

See application file for complete search history.

(56) References Cited

U.S. PATENT DOCUMENTS 1,981,300 A 11/1934 Berg
2,751,692 A 6/1956 Cortina
4,290,211 A 9/1981 Csengeri
4,445,284 A 5/1984 Sakutori (Continued)

FOREIGN PATENT DOCUMENTS

DE 296 20 436 1/1997

(Continued)

OTHER PUBLICATIONS

U.S. Appl. No. 11/932,859, filed Oct. 31, 2007, Polegato Moretti.

*Primary Examiner*—Ted Kavanaugh
(74) *Attorney, Agent, or Firm*—Oblon, Spivak, McClelland, Maier & Neustadt, P.C.

(57) ABSTRACT

A breathable shoe, including: an upper assembly having a breathable upper; a membrane made of a material which is waterproof and breathable, and a sole made of perforated elastomer, which are all mutually attached such that the membrane is arranged between the upper assembly and the sole, and the sole is sealed perimetrically to the membrane, in a manner to prevent moisture to enter into the upper assembly from the sole through the membrane, and to permit moisture to leave the inside of the upper assembly through the membrane and through the sole. In one preferred embodiment, the membrane is first attached to the upper assembly so that the upper assembly is a unitary upper assembly including the membrane, and such unitary upper assembly is subsequently attached to the sole.

13 Claims, 6 Drawing Sheets

U.S. PATENT DOCUMENTS

| | | |
|---|---|---|
| 4,599,810 A | 7/1986 | Sacre |
| 4,617,745 A | 10/1986 | Batra |
| 4,819,345 A | 4/1989 | Mulcahy |
| 4,899,465 A * | 2/1990 | Bleimhofer et al. ............ 36/14 |
| RE34,890 E | 4/1995 | Sacre |
| 5,918,382 A | 7/1999 | Haderlein et al. |
| 5,983,524 A | 11/1999 | Polegato |
| 5,992,052 A | 11/1999 | Moretti |
| 6,389,711 B1 | 5/2002 | Polegato |
| 6,508,015 B1 * | 1/2003 | Rauch ......................... 36/3 B |
| 6,604,302 B2 | 8/2003 | Polegato Moretti |
| 6,823,609 B2 * | 11/2004 | Moretti ....................... 36/30 R |
| 6,839,984 B2 | 1/2005 | Polegato |
| 6,904,705 B2 | 6/2005 | Polegato Moretti |
| 7,370,382 B2 * | 5/2008 | Polegato Moretti ....... 12/142 T |

FOREIGN PATENT DOCUMENTS

| | | |
|---|---|---|
| EP | 0 479 183 | 4/1992 |
| EP | 0 728 424 | 8/1996 |
| EP | 0 910 964 | 4/1999 |
| FR | 2 495 447 | 6/1982 |
| GB | 2 290 016 | 12/1995 |
| HU | 204986 | 9/1990 |
| HU | P9802693 | 3/2000 |
| HU | P0001668 | 9/2000 |
| HU | P0200878 | 7/2002 |
| WO | 97 14326 | 4/1997 |
| WO | 98 51177 | 11/1998 |
| WO | 99 66812 | 12/1999 |

* cited by examiner

METHOD FOR MANUFACTURING BREATHABLE SHOE

CROSS-REFERENCE TO RELATED APPLICATIONS

The present application is a continuation of U.S. application Ser. No. 11/625,468 filed Jan. 22, 2007, which is a continuation of U.S. application Ser. No. 11/177,668 filed Jul. 11, 2005, which is a divisional of U.S. application Ser. No. 10/902,783, filed Aug. 2, 2004, which is a continuation of U.S. application Ser. No. 10/009,482, filed Dec. 13, 2001, now U.S. Pat. No. 6,823,609, issued Nov. 30, 2004, which is a national stage of Application No. PCT/EP01/04050, filed Apr. 9, 2001, and claims benefit of priority under 35 U.S.C §119 to Italian Application No. PD2000A000091, filed Apr. 13, 2000, the entire contents of each of which are incorporated herein by reference.

BACKGROUND OF THE INVENTION

1. Field of the Invention

The present invention relates to a breathable shoe.

2. Discussion of the Background

It is known that a shoe, in order to be comfortable, must ensure proper exchange of heat and water vapor between the microclimate inside the shoe and the external one.

This exchange of heat and water vapor, however, must not compromise in any way the impermeableness of the shoe to external humidity or water.

Currently commercially available shoes entrust this exchange of heat and water vapor substantially to the upper or to the sole.

As regards the upper, shoes which are perforated and/or provided with linings made of a breathable and waterproof material are currently commercially available.

In some models, some parts of the upper can be replaced with materials which are indeed waterproof and breathable at the same time.

In rubber soles, many solutions have been proposed in order to solve the problem of the lack of breathability which is inherent in the characteristics of the material.

One of these solutions, disclosed in Italian patent No. 1232798, consists in dividing the sole into two layers with through holes and in interposing a breathable waterproof membrane which is joined perimetrically and hermetically to the two layers.

Variations of this solution occur in subsequent patents, all of which are in any case focused on dividing the sole into two layers in order to stop external water and dirt in a region which is as close as possible to the surface that makes contact with the ground.

This entails manufacturing complications and in particular prevents the provision of particularly thin soles.

In other cases, such as for example in European patent No. 275644, the entire sole is provided with through holes and is joined at the top with an upper having a bottom surface, which is entirely made of a waterproof breathable material (film of polytetrafluoroethylene porous foam) with the interposition of a protective layer made of porous material.

This structure is adapted for shoes whose upper is not provided with the classic methods, such as the ones known as "Strobel", "ideal welt" or "pre-assembled".

European patent No. 103601 also discloses a sole in which delimited regions are completely crossed through their thickness by holes and in which, in an upward region, a waterproof and breathable membrane is in contact with a substrate made of soft perforated material on which the foot rests; this solution is substantially equivalent to the preceding one and makes it impossible to apply classic methods.

The sole is monolithic with the upper and the entire assembly is made of plastic and is therefore not breathable.

The regions with holes are separate from the rest and are constituted by removable disks.

Substantially the same situation is proposed by French patent No. 1228239, which discloses a shoe with a sole and an upper made of the same waterproof but non-breathable (plastic) material, provided with through holes (in both the sole and the upper) and, inside the upper, a bootie made of waterproof and breathable material.

There is also an insole inside the bootie which is made of felt or similar material.

SUMMARY OF THE INVENTION

The aim of the present invention is to provide a shoe with a waterproof and breathable sole which can be manufactured with the above cited classic methods (modified appropriately) and is simpler than the ones known in the state of the art.

Within this aim, an object of the present invention is to provide a breathable shoe whose structure entails absolutely no constraints as regards styling and aesthetic research, allowing the greatest freedom to shoe shapes and types.

Another object of the present invention is to provide a breathable shoe which is meant for both day-to-day use and for sports use.

Another object of the present invention is to provide a breathable shoe whose cost is competitive with respect to the costs of known shoes.

In accordance with the invention, there is provided a breathable shoe and a method for manufacturing a breathable shoe as defined in the appended claims.

BRIEF DESCRIPTION OF THE DRAWINGS

Further characteristics and advantages of the present invention will become better apparent from the description of three embodiments thereof, illustrated only by way of non-limitative example in the accompanying drawings, wherein.

DESCRIPTION OF THE PREFERRED EMBODIMENTS

Figure 1:
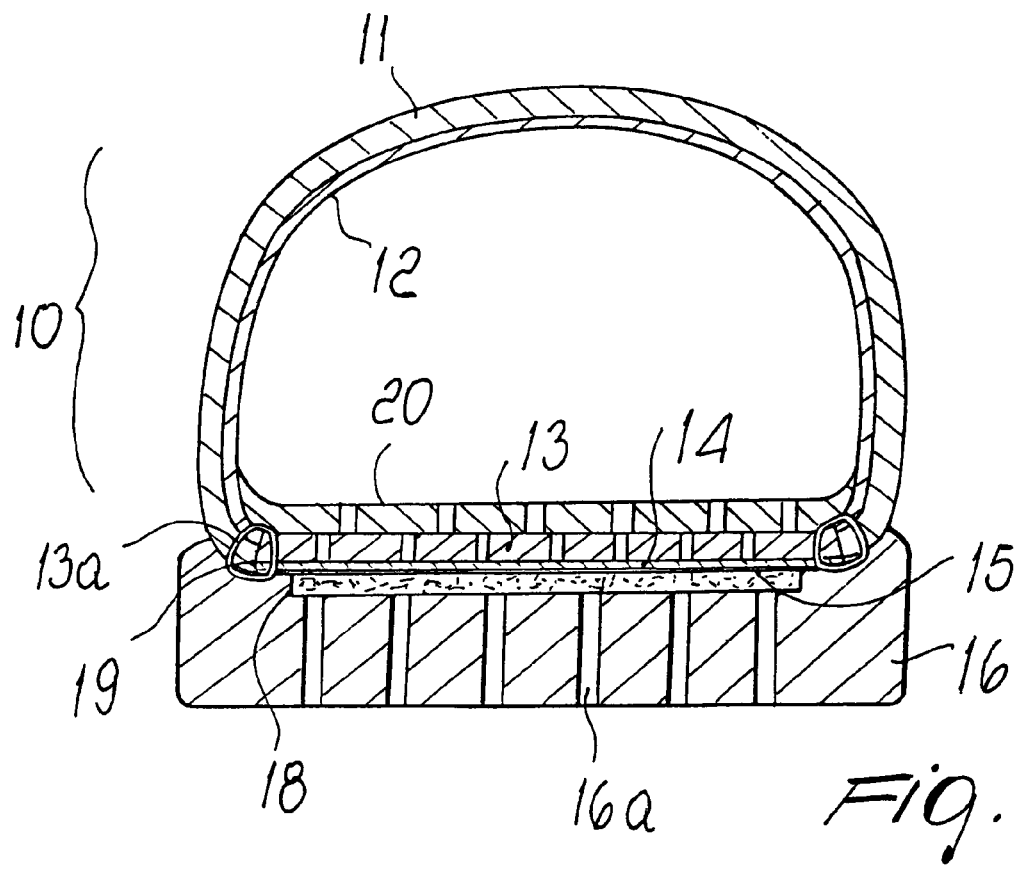
FIG. 1 is a cross-section view of a shoe according to the invention in the assembled condition, in a first embodiment.
Figure 2:
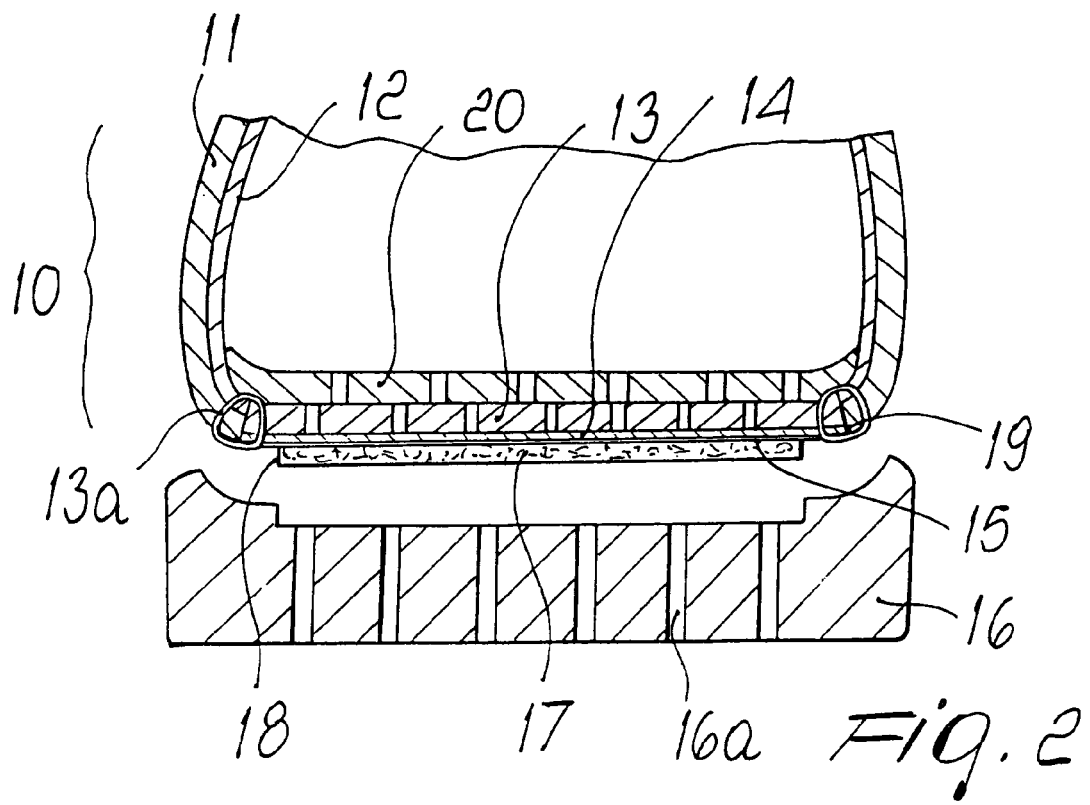
FIG. 2 is a cross-section view of the shoe of FIG. 1 prior to final assembly.

With particular reference to FIGS. 1 and 2, a breathable shoe according to the invention comprises, in this case, an assembly 10 which wraps around the foot insertion region and is in turn composed of an upper 11 which is breathable (for example made of natural leather without sealing pigments) and is associated with a breathable or perforated lining 12 (made for example of Cambrelle).

The lining 12 is associated with the upper 11 by spot-gluing, so as to not compromise breathability through said upper.

The assembly 10 furthermore comprises a breathable or perforated insole 13 which is joined, by means of stitched seams 13*a*, to the edges of said upper 11 according to the manufacturing method commonly known as "Strobel" or "ideal welt", so as to form a sack into which the assembly last, not shown in the figures, is to be inserted.

The insole 13 can be made of a material which is breathable (for example natural leather) or perforated, with an optional heel seat lining made of soft leather with absorbent rubber latex.

A membrane 14 made of a breathable and waterproof material, optionally coupled (so as to withstand hydrolysis without compromising breathability) to a supporting mesh 15 made of synthetic material, is associated with said insole 13 for example by spot gluing.

Preferably, the mesh 15 lies below the membrane 14.

The membrane 14 can be of the type that is commercially available and commonly known by the trade-name Gore-Tex.

A sole 16, formed by a single block of elastomer with through holes 16*a* through its thickness, is joined to said upper for example by gluing (with hydrolysis-resistant adhesives) or high-frequency welding along a perimetric band and is sealed perimetrically with respect to said membrane 14.

As an alternative, direct injection of the sole 16 on the upper 11 can be provided.

A protective element 17 made of a material which is hydrolysis-resistant, water-repellent, breathable or perforated is associated below said membrane 14 by spot gluing, for example by adopting a commercially available adhesive which is resistant to hydrolysis (of the kind commonly known as "hot-melt" or calendered-powder systems).

The protective element 17 can be conveniently made of a material which is water-repellent and capable of drying rapidly, such as for example non-woven fabric or needled cloth.

As an alternative, it is possible to provide a Kevlar or filtering fabric. Conveniently, the edge 18 of the protective element 17 lies inside the edge 19 of the membrane 14 in order to allow to form a seal with the sole 16.

As an alternative, the edge 19 of the membrane 14 can be folded around the edge 18 of the protective element 17, or said protective element could be thinned at the edge (if it has the same perimeter as the membrane 14) so as to allow the penetration of the sealing adhesive between the membrane 14 and the sole 16.

The protective element 17 protects the membrane 14 from external impacts or foreign objects which might penetrate through the holes provided in the sole 16.

A breathable or perforated inner sole 20 completes the shoe.

The shoe is manufactured by associating the membrane 14 and the protective element 17 with the assembly 10, which is constituted by the upper 11 and the insole 13 (fitted on the last), and subsequently joining the sole 16.

As an alternative, the membrane 14 can be joined to the sole 16 first and then the composite element can be associated with the assembly 10.

The shoe according to the invention, as shown by the description of this first embodiment, is entirely breathable, any non-breathable regions being limited substantially to the perimetric regions of the sole, which must in any case ensure a good seal with respect to external moisture and water.

Figure 3:
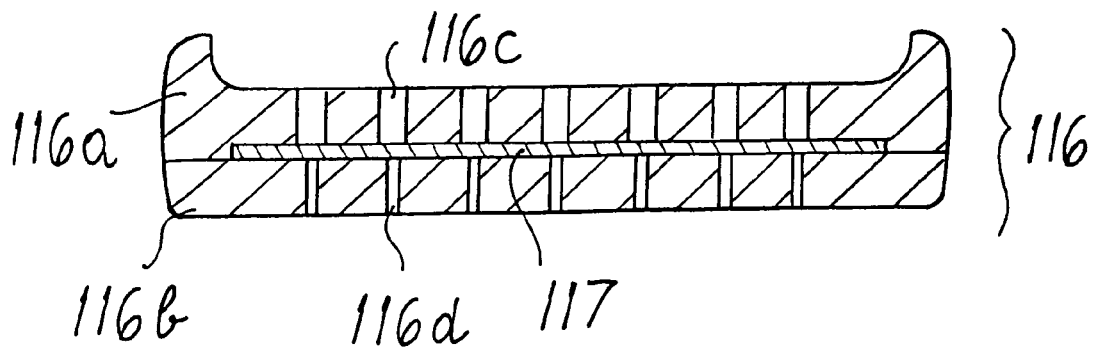
FIG. 3 is a cross-section view of the sole of a shoe according to the invention in a second embodiment thereof.

With particular reference to FIG. 3, in a second embodiment the shoe differs from the preceding case in that the protective element, now designated by the reference numeral 117, is sandwiched between two components 116*a* and 116*b* (which are mutually joined hermetically) into which the sole 116 is divided, each component having through holes 116*c* and 116*d*.

This is done if the thickness of the sole 116 is so great that it is difficult to clean it of any mud or dirt which might penetrate.

Being blocked by the protective element 117, in this case, the dirt can be released purely by virtue of the flexing of the sole, designated by the reference numeral 116.

The part above the protective element 117 of the sole 116 can act as an air chamber which increases comfort by absorbing any unevenness of the ground and increasing the ventilation of the membrane so as to rapidly dry its lower surface, when it is wet, in order to increase its breathability.

Figure 4:
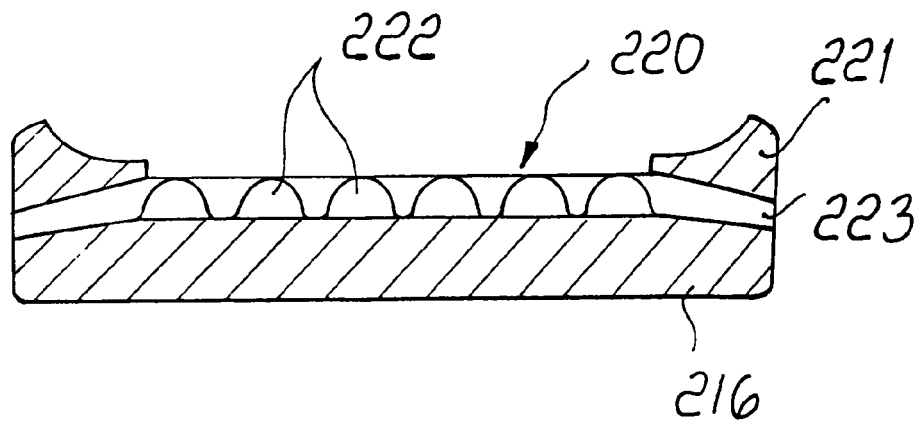
FIG. 4 is a cross-section view of the sole of a shoe according to the invention in a third embodiment thereof.

With particular reference to FIG. 4, a shoe according to the invention, in a third embodiment, differs from the preceding cases in that the sole, now designated by the reference numeral 216, has in its upper part a hollow region 220 which is delimited perimetrically by a border 221.

Dome-shaped protrusions 222 protrude from said hollow region 220, are uniformly distributed and advantageously reach the same height as said border 221.

Holes 223 or channels are provided in said border and connect the region 220 to the outside.

Each one of said holes 223 is inclined with respect to the ground contact plane, so that the outward part is lower than the inward part (this is done to avoid stagnation).

The holes 223 can furthermore be provided with one-way valves, not shown in the figures (which allow only air to flow outward).

Figure 5:
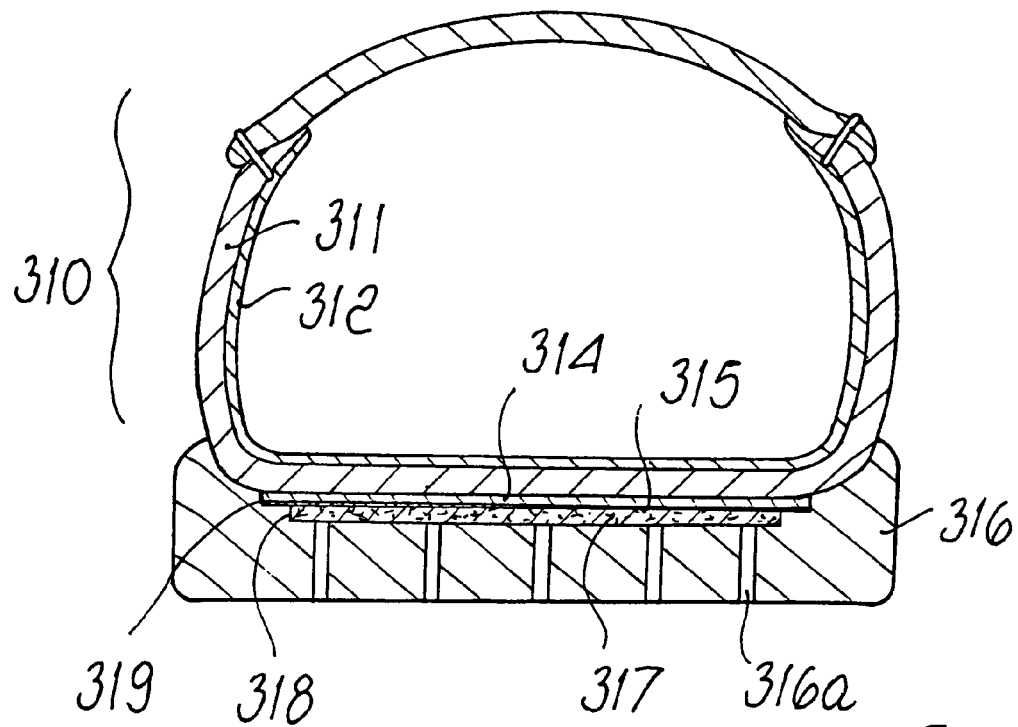
FIG. 5 is a cross-section view of a shoe according to the invention in the assembled condition, in a fourth embodiment thereof.
Figure 6:
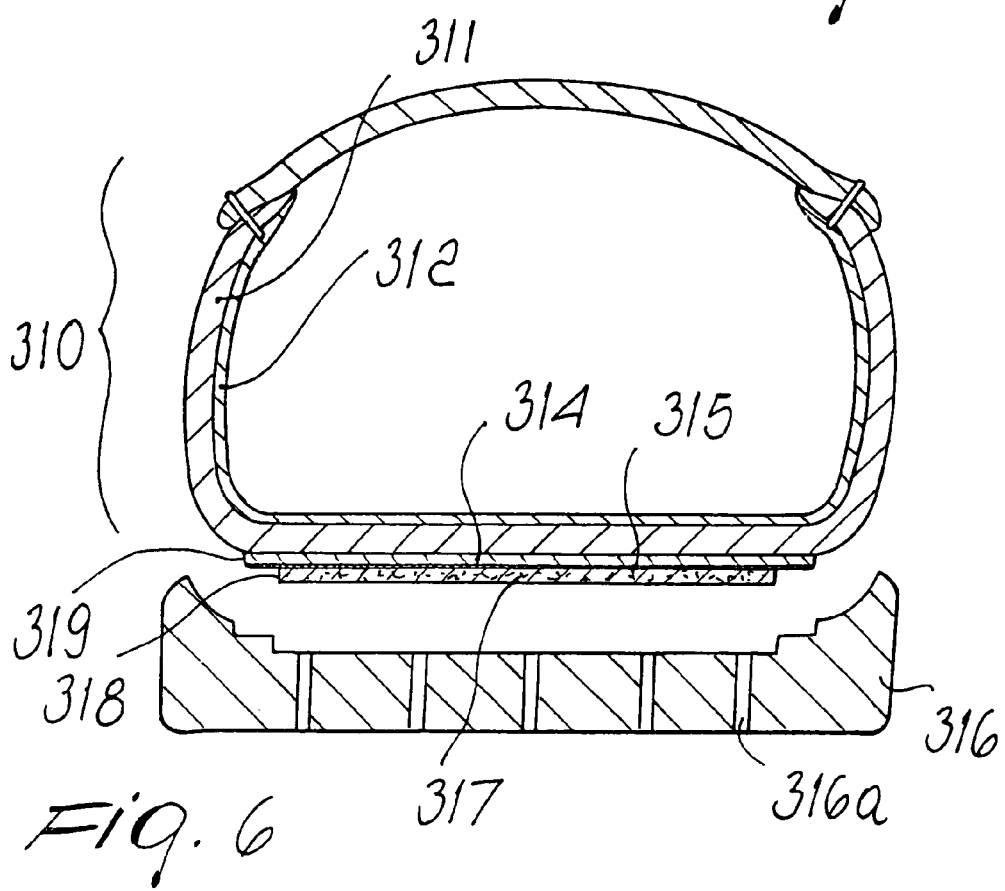
FIG. 6 is a cross-section view of the shoe of FIG. 5 prior to final assembly.

With particular reference to FIGS. 5 and 6, a breathable shoe according to the invention, in a fourth embodiment, comprises in this case an assembly 310 composed of a tubular upper 311 which is breathable (for example made of natural leather without sealing pigments) which is associated with a breathable or perforated lining 312 (made for example of Cambrelle).

The lining 312 is associated with the upper 311 by spot gluing, so as to not compromise breathability through said upper.

A membrane 314 made of breathable and waterproof material, optionally coupled (so as to withstand hydrolysis without compromising breathability) to a supporting mesh 315 made of synthetic material, is associated with the lower part of the upper 311, for example by spot gluing.

A sole 316 made of a single block of elastomer with through holes 316*a* through its thickness is joined to said upper 311, for example by gluing (with hydrolysis-resistant adhesives) or high-frequency welding along a perimetric band and is sealed perimetrically to said membrane 314.

As an alternative, it is possible to provide for the direct injection of the sole 316 over the upper 311.

A protective element 317 made of a material which is resistant to hydrolysis, water-repellent, breathable or perforated is associated below said membrane 314 by spot gluing, for example by adopting a commercially available adhesive which is resistant to hydrolysis (of the type commonly known as "hot-melt" or calendered-powder systems).

Conveniently, the edge 318 of the protective element 317 is internal to the edge 319 of the membrane 314 in order to allow to form a seal with the sole 316.

As an alternative, the edge 319 of the membrane 314 can be folded around the edge 318 of the protective element 317 or said protective element could be thinned at its edge (if it has the same perimeter as the membrane 314) until it allows the sealing adhesive to penetrate between the membrane 314 and the sole 316.

The protective element 317 protects the membrane 314 against external impacts or foreign objects which might penetrate through the holes provided in the sole 316.

As an alternative, the protective element 317 can be arranged as in the second embodiment.

In another alternative, the sole 316 can be provided as in the third embodiment.

The shoe is manufactured by associating the membrane 314 and the protective element 317 with the assembly 310, which is fitted on the last, and subsequently joining the sole 316.

As an alternative, the membrane 314 can be joined to the sole 316 first and then the composite element can be associated with the assembly 310.

Figure 7:
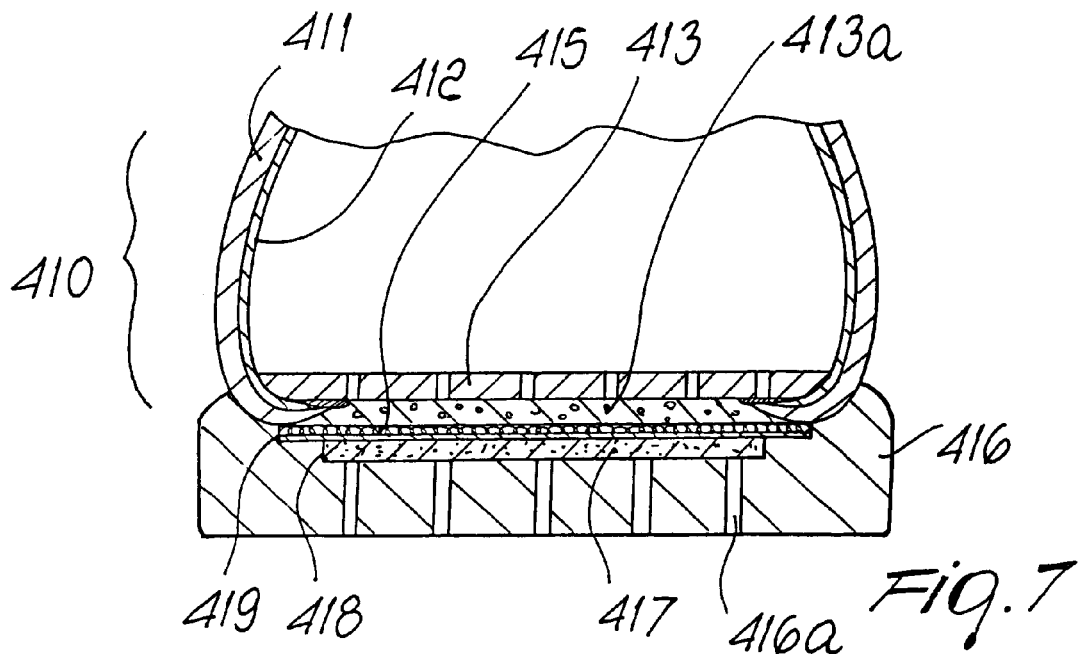
FIG. 7 is a cross-section view of a shoe according to the invention in the assembled condition, in a fifth embodiment thereof.
Figure 8:
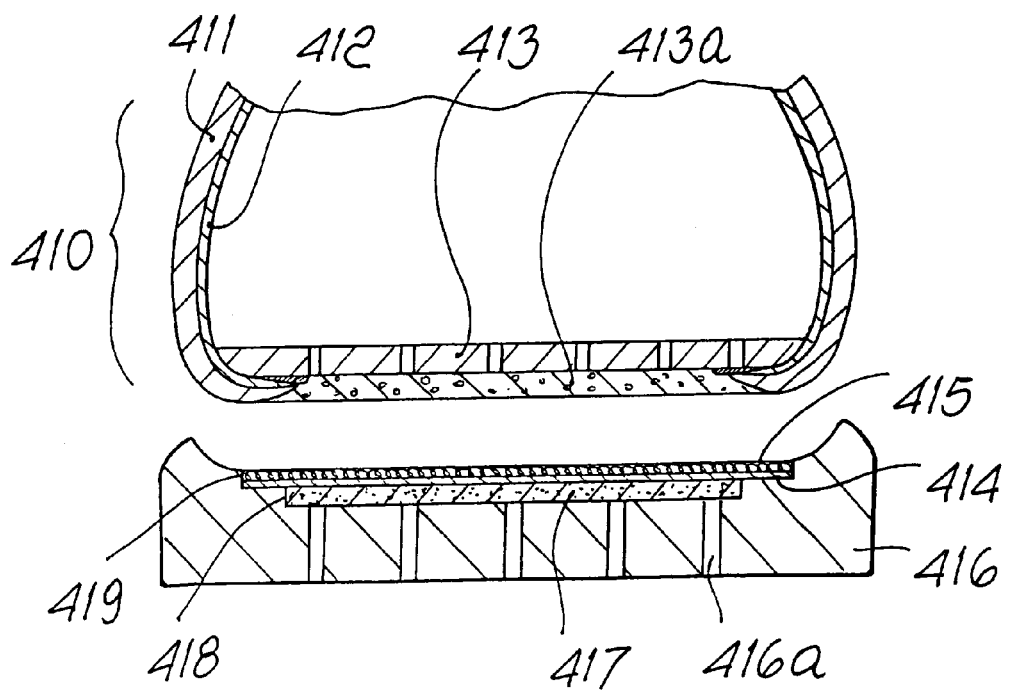
FIG. 8 is a cross-section view of the shoe of FIG. 7 prior to final assembly.

With particular reference to FIGS. 7 and 8, a breathable shoe according to the invention in a fifth embodiment comprises, in this case, an assembly 410 which wraps around the foot insertion region and is in turn composed of an upper 411 which is breathable (for example made of natural leather without sealing pigments) and is associated with a breathable or perforated lining 412 (made for example of Cambrelle).

The lining 412 is associated with the upper 411 by spot gluing, so as not to compromise breathability through said upper.

The assembly 410 furthermore comprises an assembly insole 413 which is breathable or perforated and below which the edges of said upper 411 are folded and glued (a manufacturing method known as "pre-assembled" or "AGO"), so as to form a sack in which the assembly last, not shown in the figures, is to be inserted.

The insole 413 can be made of breathable material (for example natural leather) or perforated material, with an optional heel seat lining made of soft leather with absorbent rubber latex.

The assembly 410 also comprises a breathable or perforated filler layer 413a (made for example of felt) which is surrounded by the folded edges of the upper 411.

A membrane 414 made of waterproof and breathable material, optionally coupled (so as to withstand hydrolysis without compromising breathability) to a supporting mesh 415 made of synthetic material, is associated with said filler layer 413a for example by spot gluing.

The mesh 415 is preferably in an upward region with respect to the membrane 414.

The membrane 414 can be of the commercially available type commonly known by the trade-name Gore-Tex.

A sole 416 formed by a single block of elastomer with through holes 416a through its thickness is joined to said upper for example by gluing (with hydrolysis-resistant adhesives) or high-frequency welding along a perimetric band and is sealed perimetrically with respect to said membrane 414.

As an alternative, it is possible to provide for the direct injection of the sole 416 on the upper 411.

A protective element 417 made of hydrolysis-resistant, water-repellent, breathable or perforated material is associated below said membrane 414 by spot gluing, for example by adopting a commercially available adhesive which is resistant to hydrolysis (the type commonly known as "hot-melt" or calendered-powder systems).

The protective element 417 can be conveniently made of a water-repellent material which is capable of drying rapidly, such as for example non-woven fabric or needled cloth.

As an alternative, it is possible to provide a fabric made of Kevlar or filtering fabric.

Conveniently, the edge 418 of the protective element 417 lies inside the edge 419 of the membrane 414 in order to allow to form a seal with the sole 416.

Figure 9A:
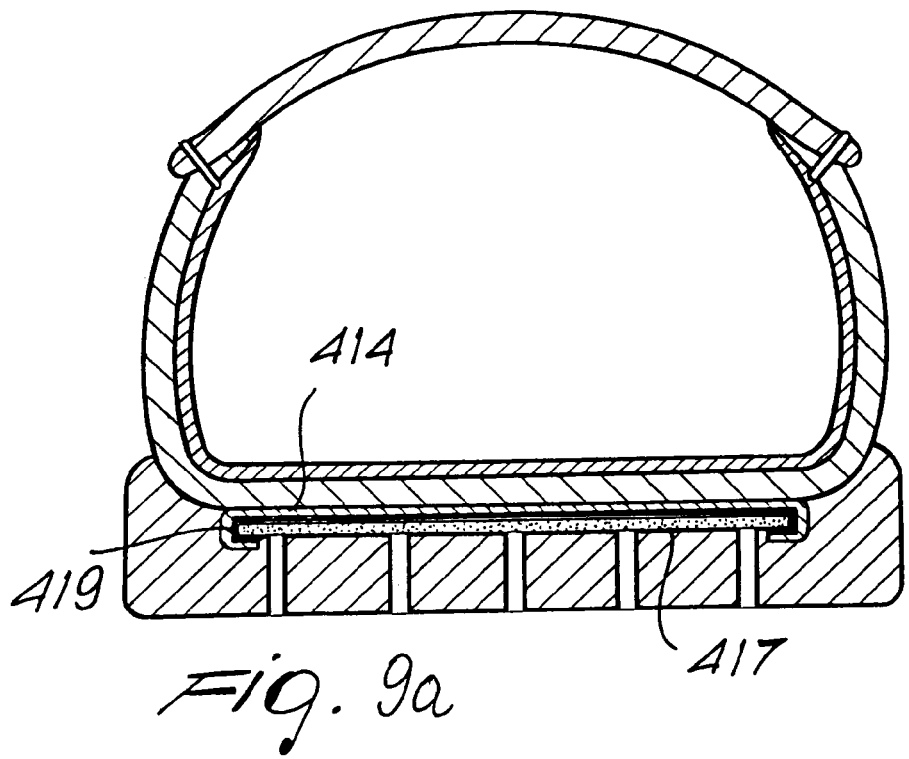
FIG. 9a is a cross-section view of a shoe including a membrane having a modified structure.
Figure 9B:
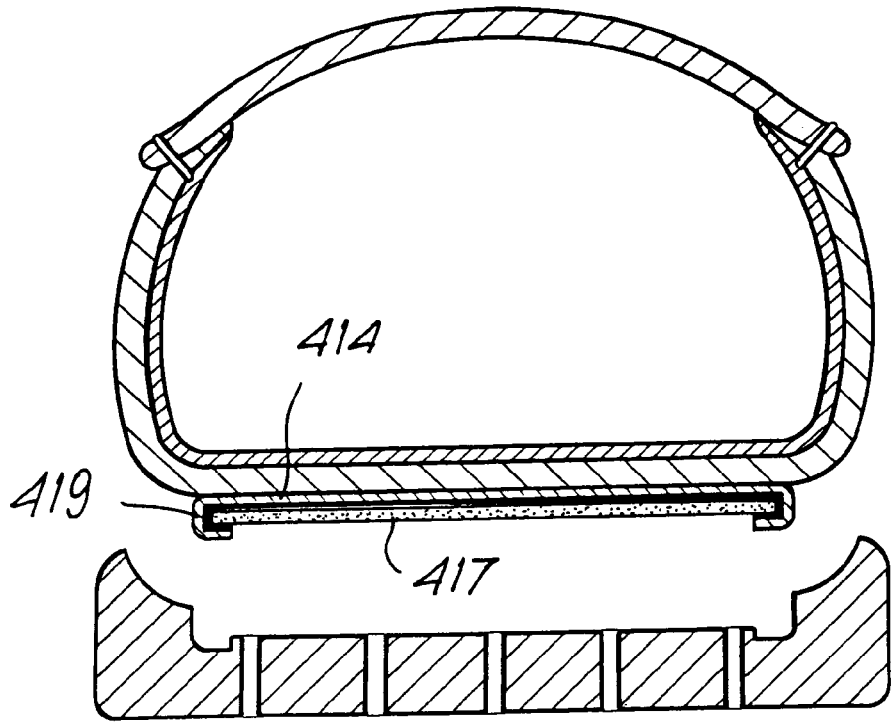
FIG. 9b is a cross-section view of the shoe of FIG. 9a prior to final assembly.
Figure 10A:
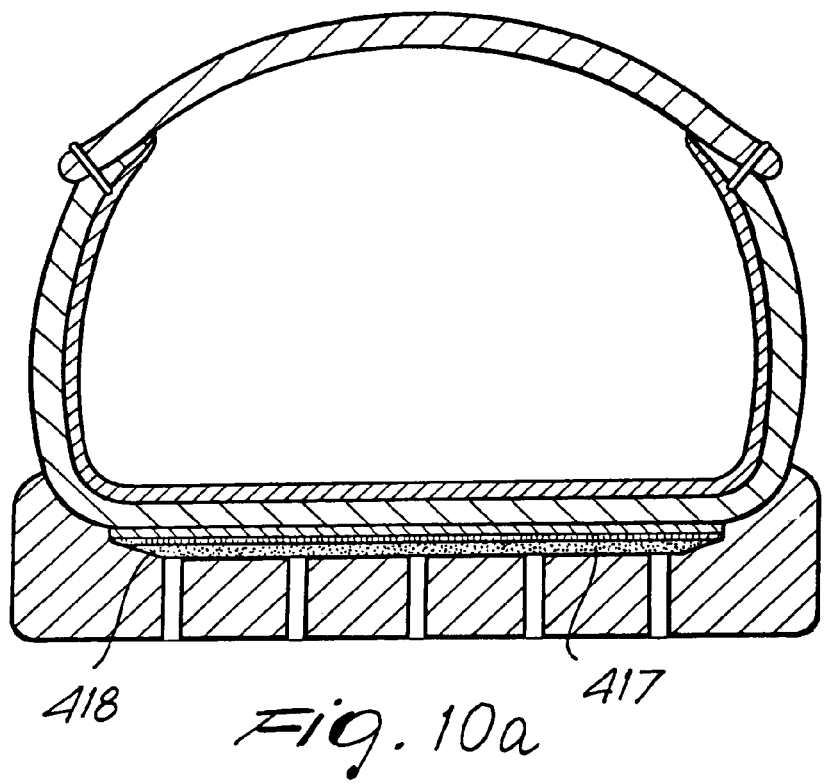
FIG. 10a is a cross-section view of a shoe including a protective element having a modified structure.
Figure 10B:
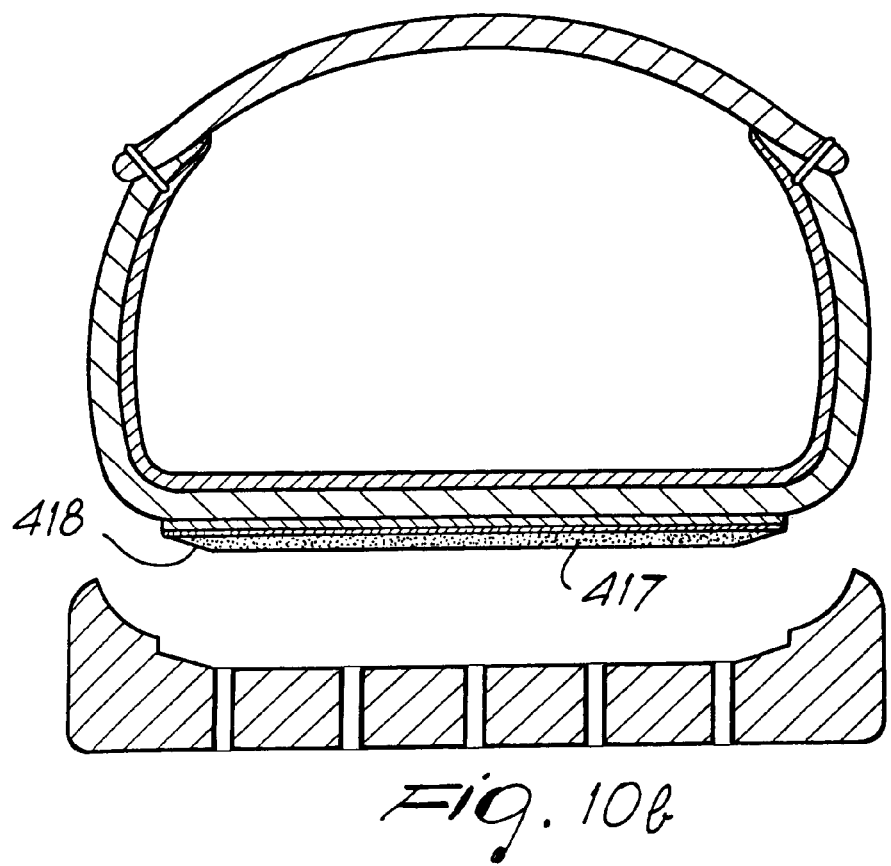
FIG. 10*b* is a cross-section view of the shoe of FIG. 10*a* prior to final assembly.

As an alternative, as shown in FIGS. 9a and 9b, the edge 419 of the membrane 414 can be folded around the edge 418 of the protective element 417 or, as shown in FIGS. 10a and 10b, said protective element could be thinned at its edge (if it has the same perimeter as the membrane 414) until it allows the sealing adhesive to penetrate between the membrane 414 and the sole 416.

The protective element 417 protects the membrane 414 against external impacts or foreign objects which might penetrate through the holes provided in the sole 416.

As an alternative, the protective element 417 can be arranged as in the second embodiment.

In a further alternative, the sole can be provided as in the third embodiment.

The shoe is manufactured by associating the membrane 414 and the protective element 417 with the assembly 410, constituted by the upper 411, the assembly insole 413 and a filler layer 413a (mounted on the last), and subsequently joining the sole 416.

As an alternative (FIG. 8), the membrane 414 can be joined to the sole 416 first and then the composite element can be associated with the assembly 410.

In practice it has been observed that the present invention has achieved its intended aim and objects.

A shoe with a waterproof and breathable sole has in fact been provided by using the "Strobel", "ideal welt", "pre-assembled" and other classic methods (modified appropriately) in a simpler manner than shoes known in the state of the art.

It should also be observed that the shoe according to the invention perfectly fulfills the need to have optimum exchange of heat and water vapor between the internal microclimate and the external one, while maintaining a complete impermeableness to water and moisture.

It is observed that all this has been achieved while maintaining a shoe structure which is highly flexible and adaptable to any type of styling and to any aesthetic and economical level required by the market.

It is also observed that the structure of the shoe according to the invention can be easily mass-produced, since the operations can be fully automated.

It is further observed that the structure of the shoe according to the invention allows a certain flexibility as regards the association of its components, thus leading to considerable production savings in relation to its flexibility and adaptability to the various manufacturing situations and conditions.

The present invention is susceptible of numerous modifications and variations, all of which are within the scope of the inventive concept; all the details may furthermore be replaced with other technically equivalent elements.

The material, as well as the dimensions, may be any according to requirements.

What is claimed as new and desired to be secured by Letters Patent of the United States is:

1. A breathable shoe comprising:
   an assembly for wrapping around a foot insertion region of the shoe and comprising a breathable upper;
   at least one membrane having a supporting mesh coupled thereto and being made of a material that is waterproof and breathable and is connected with said assembly in a downward region of said assembly completely below said assembly and such that an upward-facing perimetral portion of the supporting mesh coupled to the membrane is arranged directly in contact with a downward-facing portion of said upper of said assembly;
   a sole being made of perforated elastomer and being joined to said upper and sealed perimetrically to said membrane;
   a protective element made of a material that is resistant to hydrolysis, water repellant, and breathable or perforated, said protective element being arranged below said membrane in a region between an upper part of said sole, said protective element lying inside an edge of said membrane for forming a seal with said sole.

2. The shoe according to claim 1, wherein said assembly is composed of:
   said breathable upper;
   a breathable or perforated assembly insole below which edges of said upper are folded and glued so as to form a sack; and
   a breathable or perforated filler layer that is surrounded by said folded edges of said upper.

3. The shoe according to claim 1, wherein said sole is made of a block of elastomer with through holes through a thickness thereof, said sole being joined to said upper along a perimetric band being sealed perimetrically to said membrane.

4. The shoe according to claim 1, wherein said sole is joined to said upper by gluing with hydrolysis-resistant adhesives.

5. The shoe according to claim 1, wherein said sole is joined to said upper by high-frequency welding.

6. The shoe according to claim 1, wherein said sole is joined to said upper by direct injection in a mold.

7. The shoe according to claim 1, wherein said protective element is made of a material that is water-repellent and capable of drying rapidly.

8. The shoe according to claim 1, wherein said protective element is made of Kevlar fabric.

9. The shoe according to claim 1, wherein said protective element is made of filtering fabric.

10. The shoe according to claim 1, wherein said upper is connected with a breathable or perforated lining by spot gluing.

11. The shoe according to claim 1, wherein said supporting mesh is made of synthetic material.

12. The shoe according to claim 1, wherein said protective element is provided in a first seat of the sole and in that said membrane is provided in a second seat of said sole extending above said first seat.

13. The shoe according to claim 1, wherein said membrane is connected to a lower part of said upper.

* * * * *